(12) United States Patent
Arai

(10) Patent No.: US 9,255,735 B2
(45) Date of Patent: Feb. 9, 2016

(54) PROCESS AND APPARATUS FOR MANUFACTURING CONFECTIONERY PRODUCTS

(75) Inventor: Seiichi Arai, Saitama (JP)

(73) Assignee: ARAI FOODS MACHINERY CO., LTD., Fukaya-Shi, Saitama (JP)

( * ) Notice: Subject to any disclaimer, the term of this patent is extended or adjusted under 35 U.S.C. 154(b) by 1166 days.

(21) Appl. No.: 12/436,303

(22) Filed: May 6, 2009

(65) Prior Publication Data

US 2009/0304887 A1    Dec. 10, 2009

(30) Foreign Application Priority Data

Jun. 9, 2008  (JP) ................................. 2008-151130

(51) Int. Cl.
 F26B 11/04    (2006.01)
 A21C 9/00    (2006.01)
 F26B 17/20    (2006.01)
(52) U.S. Cl.
 CPC ............... *F26B 11/0481* (2013.01); *A21C 9/00* (2013.01); *F26B 17/205* (2013.01)
(58) Field of Classification Search
 CPC .................................................. F26B 11/0481
 See application file for complete search history.

(56) References Cited

U.S. PATENT DOCUMENTS 5,321,900 A * 6/1994 Meyer .............................. 34/180
2006/0254082 A1 * 11/2006 Kim ................................. 34/595

FOREIGN PATENT DOCUMENTS

JP    2002-34460    7/2000
JP    2004313052 A * 11/2004    ............... A23G 3/48

OTHER PUBLICATIONS

Machine Translation of JP 2002-034460 to Arai S. Published Feb. 5, 2002. pp. 1-7.*
Machine Translation of JP 2004-313052 to Arai K. Published Nov. 11, 2004. pp. 1-10.*

* cited by examiner

*Primary Examiner* — Jenna A Watts
(74) *Attorney, Agent, or Firm* — Notaro, Michalos & Zaccaria P.C.

(57) ABSTRACT

In order to provide a process and an apparatus for manufacturing confectionery products made from cereals, in particular thin ones having uniform shapes, which solve disadvantages in transporting such products, it is characterized in that a first and a second drying steps are arranged prior to cut-out baking raw material dough pieces in manufacturing thin confectionery products made from cereals and having uniform shapes, in which in the first drying step, drying is conducted by a step of transporting the raw material dough pieces aligned on transporting conveyor belts under a hot blast atmosphere inside a first drying compartment, a maturing step in a cooling state is arranged following a completion of the first drying step, and in the second drying step, drying is conducted by a step of transporting the raw material dough pieces in their mixed state under a hot air atmosphere inside rotary drums in an axial direction in a second drying compartment.

5 Claims, 21 Drawing Sheets

PROCESS AND APPARATUS FOR MANUFACTURING CONFECTIONERY PRODUCTS

FIELD OF THE INVENTION

The present invention relates to a process and an apparatus for manufacturing confectionery products made from cereal and having uniform shapes which are represented by, for example, Japanese rice crackers, and in particular those suitable in use for a manufacture of thin confectionery products.

BACKGROUND ART

Conventionally, a manufacture of rice confectionery products represented by Japanese rice crackers comprises steps as follows: compounding and kneading pulverized raw material rice (non-glutinous and glutinous rice) under vapor (the step may also be called "steaming and kneading"); rolling the products using a rolling roller in a variety of thicknesses; and cutting the rolled products into a variety of uniform shapes using a shape cutting roller. Thereafter, the cut-out rice confectionery dough pieces are dried and water content thereof is adjusted by being arranged in lines on a transporting conveyor belt and being transported inside a drying compartment under a hot blast atmosphere, before they go through a step of baking inside a baking apparatus. However, a maturing step is normally arranged prior to baking inside the baking apparatus, so that differences in water content between the interior and exterior of a single rice confectionery dough piece dried using the drying apparatus, and varied water content between each of the rice confectionery dough pieces, which arises from drying the products arranged in lines on the transporting conveyor belts under a hot blast inside a hot blast drying compartment, are adjusted so as to equalize the overall water content.

The maturing step for adjusting and equalizing the water content in each of the rice confectionery dough pieces is considered as an important step in that a crack and a curved profile during baking can be prevented. Conventionally, the maturing step has been realized by putting the rice confectionery dough dried by hot blast inside the drying compartment into containers, cardboard boxes and the like, and leaving them for several hours to more than 10 hours or dozens of hours, so that the water content between the interior and the exterior of a single rice confectionery dough piece and between each of the rice confectionery dough pieces are adjusted for an overall equalization of the water content.

Rice confectionery dough pieces are classified according to their thicknesses into thin (0.5 to 1.5 mm thick), middle-sized (1.5 to 3.0 mm thick) and thick (of thickness over 3.0 mm) pieces, and average durations of maturing for respective (rice confectionery) dough pieces are listed on the following table:

TABLE 1

| | Least "maturing" duration | Optimal "maturing" duration |
|---|---|---|
| 1) Thin pieces | 2 hrs | 12 hrs (half a day) |
| 2) Middle-sized pieces | 6 hrs | 24 hrs (one day) |
| 3) Thick pieces | 10 hrs | 48 hrs (two days) |

Least maturing duration on the above Table 1 refers to a duration under which a manufacture of rice crackers is barely possible and optimal maturing duration is normally applied for improving the maintenance of quality in the rice crackers.

This conventional and commonly known maturing step comprises the following steps: (first) releasing rice confectionery dough dried by hot blast in a drying compartment using a releasing conveyor; (second) dividing the dough into pieces and packing them into containers, cardboard boxes and the like; and (third) leaving them for several hours to more than 10 hours or dozens of hours. Therefore, it is problematic that the step requires labor and the maturing duration, as well as labor and time for picking up the rice confectionery dough pieces after the maturing step from the containers, the cardboard boxes and the like, and for arranging them in lines on a transporting wire mesh conveyor belt of a baking apparatus.

Therefore, the applicant of the present invention has proposed a process and an apparatus for manufacturing rice confectionery products, wherein the required labor and time accompanying the maturing step can be remarkably reduced. A commonly known document in this regard is JP Laid-Open Patent Application No. 2002-34460.

In a process for manufacturing rice confectionery products as disclosed in the Laid-Open Patent Application, a maturing step which is inserted between a drying step and a baking step of rice confectionery dough pieces is realized by adjusting the atmospheric temperature and the transfer speed of the rice confectionery dough pieces already subjected to the drying step, while transferring them to the baking step.

Furthermore, an apparatus for manufacturing the same comprises a hot blast drying compartment and a maturing compartment, which both are provided inside a drying compartment for the rice confectionery dough pieces.

The process and apparatus for manufacturing rice confectionery products are epoch-making in that the above-mentioned time and labor required for the conventional maturing step can be remarkably reduced, but, in case of thin rice confectionery dough pieces having a thickness of about 0.5 to 1.5 mm, a sufficient adjustment in water content cannot be achieved even by using the above-mentioned process and apparatus, so that there may occur, during baking, a crack, a curved profile or a skin formation wherein only the surface of a dough gets hard.

Such a problem is not limited to the rice confectionery products, but arises also in other kinds of thin confectionery pieces made from wheat, etc. during their manufacturing process.

SUMMARY OF THE INVENTION

Therefore, an object of the present invention is to provide a process for manufacturing thin confectionery products made from cereals, in particular thin ones having uniform shapes, for solving the above-mentioned disadvantages in transporting such products.

To achieve the above-mentioned object, a process for manufacturing confectionery products made from cereals according to the present invention is characterized in that the process comprises a first drying step and a second drying step between a shape cutting step and a baking step, the first drying step involving adjusting the water content of the raw material dough pieces, and the second drying step involving further adjusting the water content of the raw material dough pieces received from the first drying step; wherein for the first drying step, the first drying compartment is used as divided via a partition wall into an upper level as a hot blast drying compartment and a lower level as a maturing compartment, the raw material dough pieces are arranged in lines and while transported on a transporting conveyor belt, the raw material dough pieces are dried in a hot blast in the hot blast drying compartment on the upper level, the raw material dough pieces are next transported from a transporting conveyor belt of the hot blast drying compartment on the upper level to a transporting conveyor belt of the maturing compartment on the lower level, and the raw material dough pieces, as arranged in lines on the transporting conveyor belt, are transported in the maturing compartment, so as to undergo a cooling step and a maturing step; and wherein for the second drying step, a second drying apparatus is employed which is a second drying compartment and a plurality of rotary drums, the rotary drums each having transporting band bodies with spiral shapes and being rotated of each other in an axial direction in the second drying compartment, and the raw material dough pieces after the first drying step are received by a first rotary drum of the plurality of the rotary drums, so that the raw material dough pieces are transported in an unarranged state in an axial direction and dried, and the raw material dough pieces are then sequentially transported respectively to subsequent rotary drums by chute means, so that drying is conducted, while directions of delivery are alternately switched.

In this case, the present invention is characterized in that in said first drying compartment of the first drying step has a conveyor belt for cooling and a conveyor belt for maturing, and during said maturing step, a travel speed for the conveyor belt for maturing is reduced as compared with the conveyor belt for cooling.

The present invention is further characterized in that the water content of the raw material dough pieces is so adjusted that it becomes 13 to 14% at the time of completion of the first drying step Moreover, the present invention is characterized in that water content of the raw material dough pieces is adjusted that it becomes 12%±0.5 at the time of completion of the maturing step.

In addition, the present invention is characterized in that the water content of raw material dough pieces is so adjusted that it becomes 11%±0.5 at the time of completion of the second drying step.

In addition, the present invention is characterized in that in the second drying step, the raw material dough pieces are transported in an unarranged state and in a mutually overlapped manner under a heated atmosphere while sequentially altering directions of delivery inside a plurality of stages of rotary drums in an axial direction.

Additionally, the present invention is characterized in an apparatus for manufacturing thin confectionery products made from cereals and having uniform shapes, in that it has a first drying apparatus and a second drying apparatus for adjusting water content of raw material dough between a shape cutting apparatus and a baking apparatus, in which the first drying apparatus divides a drying compartment via a partition wall into an upper level and a lower level, wherein in the upper level, a plurality of stages of transporting conveyor belts is provided for transporting aligned raw material dough pieces, and wherein the lower level comprises a transporting conveyor belt for cooling the raw material dough pieces received from the upper level and a transporting conveyor belt for receiving and maturing the cooled raw material dough pieces.

Still further, the present invention is characterized in an apparatus for manufacturing thin confectionery products made from cereals and having uniform shapes, in that it has a first drying apparatus and a second drying apparatus for adjusting water content of raw material dough between a shape cutting apparatus and a baking apparatus, in which the first drying apparatus divides a drying compartment via a partition wall into an upper level and a lower level, wherein in the upper level, a plurality of stages of transporting conveyor belts is provided for transporting aligned raw material dough pieces, wherein the lower level comprises a transporting conveyor belt for cooling the raw material dough pieces received from the upper level and a transporting conveyor belt for receiving and maturing the cooled raw material dough pieces, and in which the second drying apparatus is provided with a second drying compartment, a plurality of rotary drums each having an inlet and an outlet and being rotatably provided inside the second drying compartment, transporting belt bodies spirally provided inside the rotary drums and a chute means for transporting the raw material dough pieces from the uppermost one to the lowest one of the plurality of rotary drums.

Still further, the present invention is characterized in that in an apparatus for manufacturing thin confectionery products made from cereals and having uniform shapes, a second drying apparatus provided after a first drying apparatus is provided with a second drying compartment, a plurality of rotary drums each having an inlet and an outlet and being rotatably mounted in the second drying compartment, transporting belt bodies provided in a shape of spiral stairs inside the rotary drums and a chute means for transporting the raw material dough pieces from the uppermost one to the lowest one of the plurality of rotary drums.

Still further, the present invention is characterized in that the rotary drums comprise transporting belt bodies in spiral shape having a circular cross-section, stationary bars provided on their outer circumference and an outer circumference wall of a shape of wire mesh covering an outer circumference of the transporting belt bodies.

Still further, the present invention is characterized in that the rotary drums are controlled in their movement in an axial direction by a convex-concave fitting of driven rings mounted outside on the both side portions of the rotary drums and driving rollers for transmitting a rotary driving force to the driven rings.

Still further, the present invention is characterized in that the rotary drums are rotatably supported by the driving rollers for supporting the driven rings on their both sides mounted outside on the both side portions of the rotary drums and transmitting a rotary driving force to the driven rings.

Still further, the present invention is characterized in that the rotary drums are mounted in a plurality of stages and a driving motor is installed on each of the rotary drums.

Still further, the present invention is characterized in that each side of the rotating rollers provided on both sides of each of the rotary drums is coaxially coupled via a rotary shaft, wherein rotary driving force is transmitted via a driving force transmitting mechanism from one rotary shaft connected to the driving motor to the other rotary shaft so that all of the four rotating rollers can rotate at an identical speed.

According to the present invention, in particular during the second drying step of raw material dough pieces, each of the raw material dough pieces is transported in a mixed state using the second drying apparatus inside the rotation (rotary) drums put under hot blast atmosphere or heating (heated) atmosphere, so that the raw material dough pieces, even if they are thin, are equally adjusted in water content between the interior and the exterior of a single dough piece or between each of the (raw material) dough pieces, so that a crack, a curved profile or a skin formation of a finished product can be prevented and a manufacture of confectionery products which are satisfactorily yielded can be realized.

DETAILED DESCRIPTION OF THE PREFERRED EMBODIMENTS

Hereinafter, the present invention will be described with reference to the case where it is applied to thin rice confectionery products, but it is also applicable to, other than the rice confectionery products, confectionery products such as snacks made from cereals such as wheat and having uniform shapes.

Figure 1:
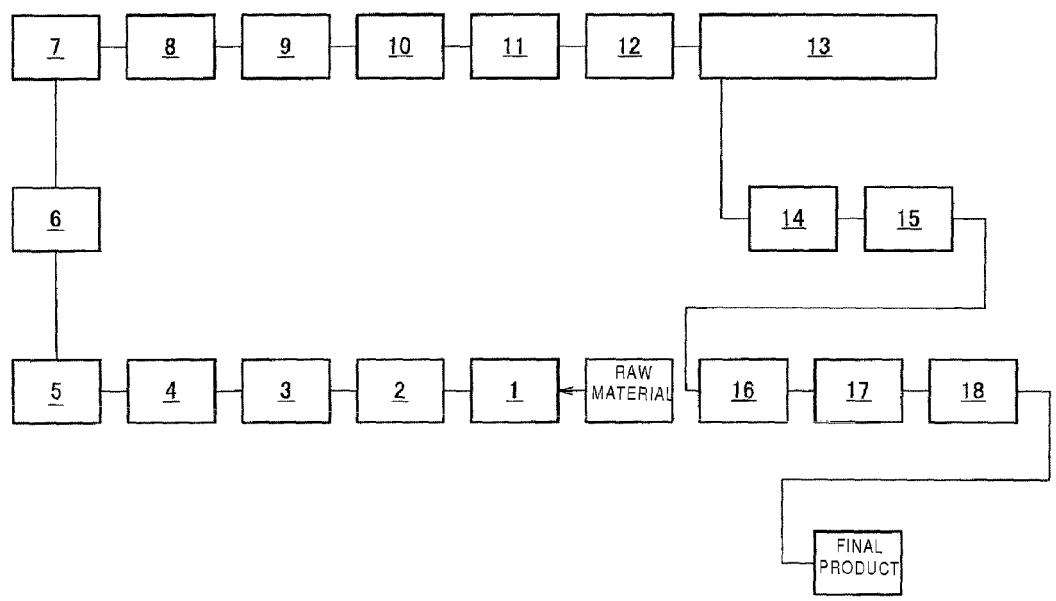
FIG. 1 is a block diagram for an explanation of the present invention.
Figure 2:
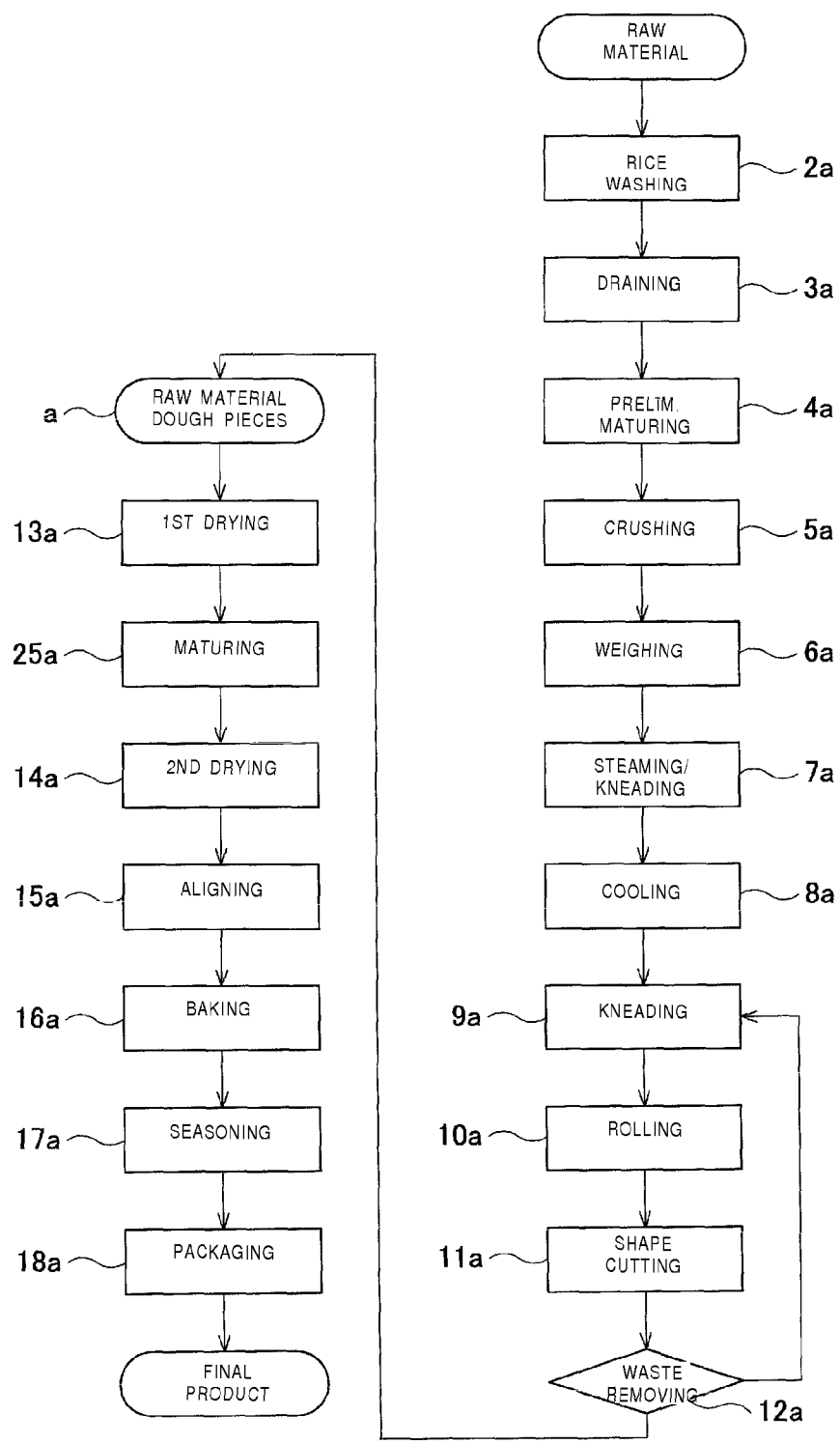
FIG. 2 is a flow chart for an explanation of the steps for manufacturing confectionery products made from cereals according to the present invention.

In the following, the best modes for an embodiment of the present invention will be described based on the accompanying drawings. FIG. 1 is a block diagram showing an apparatus for manufacturing confectionery products according to the present invention, while FIG. 2 is a flow chart explaining a process for manufacturing the confectionery products. Reference is made, using the block diagram and the flow chart, to the case where thin rice confectionery products are manufactured. First, non-glutinous rice to be raw material sorted using a sorting machine is collected in a rice storage tank 1, and then the raw material rice in the rice storage tank 1 is transferred to a rice washing machine 2 so as to undergo a rice washing step 2a. The rice is then subjected to a draining step 3a via a draining apparatus 3, and after that, it is transferred to a preliminary maturing tank 4. After a preliminary maturing step 4a, wherein the raw material rice sufficiently absorbs moisture (to 28 to 34% in water content) in the preliminary maturing tank 4, it undergoes a crushing step 5a wherein it is crushed using a crusher 5, and pulverized. Thereafter, the pulverized rice confectionery raw materials are subjected to a weighing step 6a wherein they are weighed using a weigh machine 6, and after that, they undergo a steaming/kneading step 7a, during which they are put into a steaming/kneading machine 7 to be steamed and kneaded, so that contained starchy material is pregelatinized. Subsequently, the kneaded product of rice confectionery raw material is subjected to a cooling step 8a, during which it is cooled using a cooling apparatus 8 to lower a temperature before a kneading step 9a, during which it is more carefully kneaded using a kneading machine 9 for equalizing the kneaded dough. The step is further followed by a rolling step 10a during which the kneaded product is delivered to a rolling roller 10 on which the dough is rolled to a desired thickness having a belt-like form. Further, the product is cut out using a shape cutting apparatus 11 comprising a shape cutting roller during a shape cutting step 11a. Note that, cut-out wastes generated in the step are removed during a waste-removing step 12a using a waste-removing means 12. These cut-out wastes are placed back to the kneading machine 9, and become raw material to be cut out again. The cut-out raw material dough pieces a are arranged in lines on a transporting conveyor belt 30 and delivered in this manner into a first drying apparatus 13, so that they are subjected to a first drying step 13a. While raw material dough pieces travel in lines on the transporting conveyor belts 30 arranged at several stages inside a first drying compartment during the drying step 13a in the first drying apparatus 13, as will be described later, the (raw material) dough pieces are dried so that their water content is adjusted to 13 to 14%. A maturing compartment 25 comprising a hot blast drying compartment 24, a cooling portion 26 and a maturing portion 27 as described below is located in the first drying compartment of the first drying apparatus 13. In the cooling portion 26 and the maturing portion 27 the raw material dough pieces undergo a maturing step 25a, wherein their water content is further adjusted to approximately 12%±0.5, and thereafter they are released by a releasing conveyor 33 from the first drying apparatus 13 and then transported via a transporting conveyor belt 37 to a second drying apparatus 14. The dough pieces undergo a second drying step 14a with the second drying apparatus 14, wherein their water content is further adjusted to approximately 11%±0.5. After that, the raw material dough pieces are subjected to an aligning step 15a, wherein they are aligned by an aligner 15, and then the dough pieces are transported to a baking apparatus 16 of a following step. After the pieces are baked during a baking step 16a in the baking apparatus 16, they are seasoned during a following seasoning step 17a by a seasoning apparatus 17. The pieces are then packaged during a packaging step 18a by a packaging apparatus 18, so that they are finished as products.

A duration necessary for steps from an initial infusion of raw material up to a finish of the products is approximately 3 hours, so that a preparation of the finished products can be realized within a remarkably reduced duration in comparison to the conventionally taken one.

Figure 3:
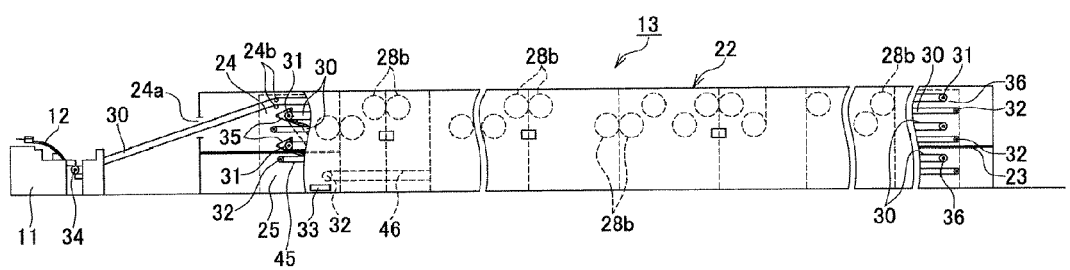
FIG. 3 is a schematic elevation view showing a first drying apparatus for an embodiment of the present invention.
Figure 4:
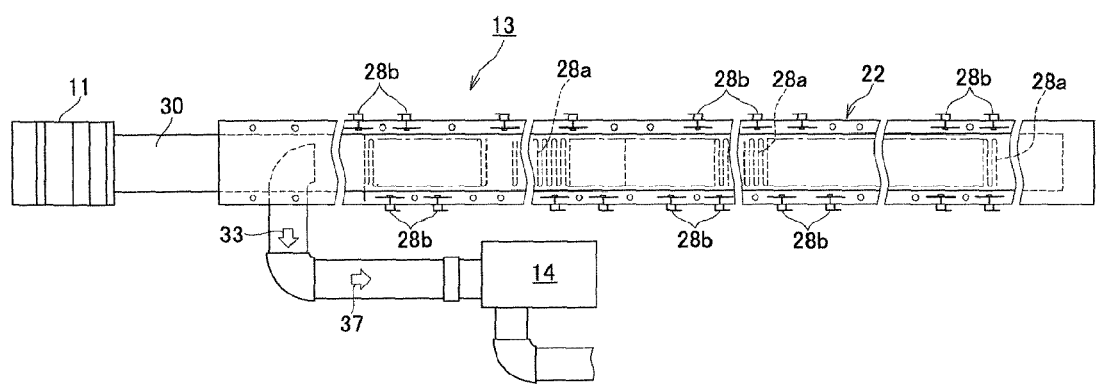
FIG. 4 is a schematic plan view showing a first drying apparatus for an embodiment of the present invention.
Figure 5:
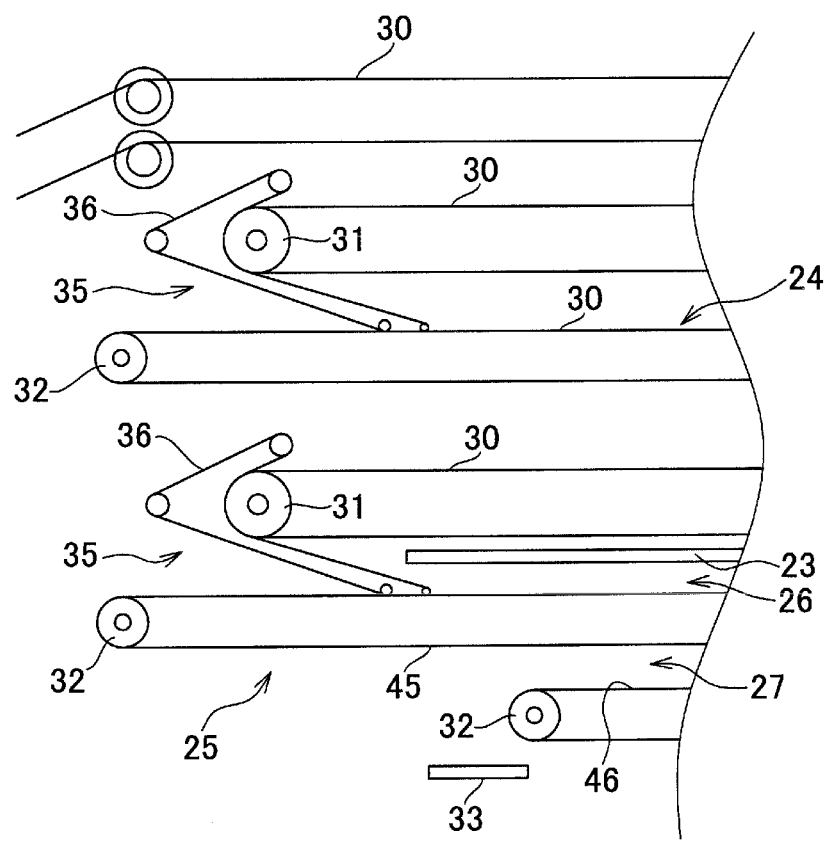
FIG. 5 is an explanatory diagram for an explanation of transportation of raw material dough pieces using transporting conveyor belts inside a first drying apparatus for an embodiment of the present invention.
Figure 6:
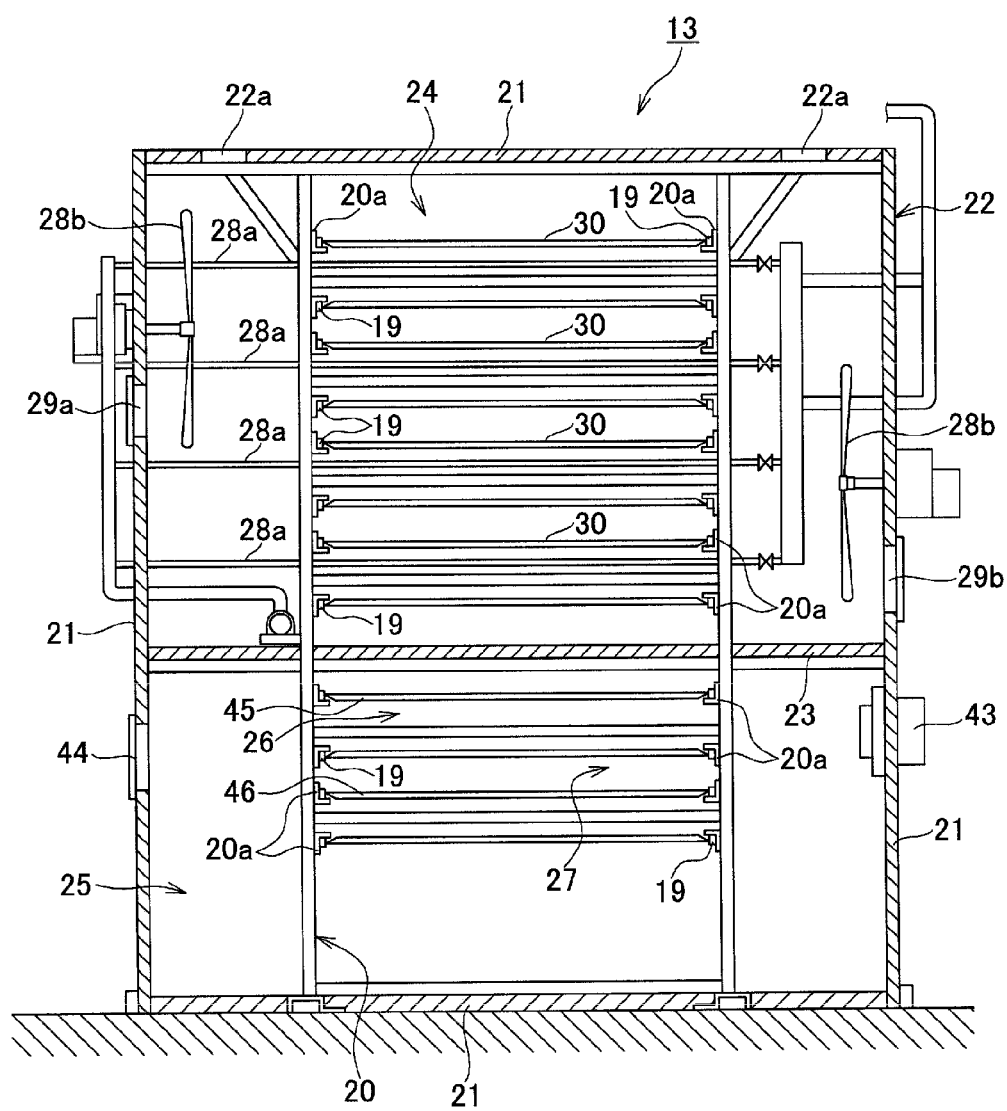
FIG. 6 is a schematic side cross section showing the interior of a first drying apparatus for an embodiment of the present invention.

FIGS. 3 to 7 show the first drying apparatus 13, respectively in a schematic view, and according to these drawings, more specifically as shown in FIGS. 3 and 4, the first drying apparatus 13 has a long and large first drying compartment 22 in a box shape, whose length is 80 to 200 m, wherein the circumference of a frame 20 is covered with isolation panels 21. The first drying compartment 22 has, though largely shortened in length in the drawings, a length of approximately 115 m in the embodiment. In the first drying apparatus 13, a middle part in the longitudinal direction of the first drying compartment 22 is separated in the long side direction using an isolation panel 23 into two smaller compartments, of which the upper serves as the hot blast drying compartment 24, and the lower as the maturing compartment 25. In the maturing compartment 25, in particular as shown in FIG. 6, the cooling portion 26 and the maturing portion 27 are provided without a partition using an isolation panel. The maturing portion 27 may be provided along the whole length of the long and large first drying compartment 22, or provided along a part of its length. In the illustrated embodiment, the maturing portion 27 is constructed to have a slightly short length. What is applicable to a length of a transporting conveyor inside the maturing compartment 25 also applies to the case of the cooling portion 26.

The hot blast drying compartment 24 further comprises inside thereof, as shown in FIGS. 3 and 4, a large number of heaters 28a and a large number of hot blast stirring fans 28b which are installed substantially at same intervals along substantially the whole length of the compartment, and four stages of transporting conveyor belts 30, 30 . . . altogether corresponding to more than a half of its internal volume are suspended over the whole length of the first drying compartment 22. The respective transporting conveyor belt 30 at each stage has driving rollers 31 and end rollers 32 at both end portions thereof, but only the transporting conveyor belt 30 at the uppermost stage is guided to the outside through an inlet 24a formed on one end portion of the hot blast drying compartment 24 via a guiding roller 24b, so that it is suspended at a roller 34 installed on a lower side of a transporting conveyor belt of the shape cutting apparatus 11, to which an assembly is not limited.

The heaters 28a are, particularly as shown in FIG. 6, steam tubes in which steam passes through, but are not limited to such tubes. Alternatively, electrical heaters, gas heaters, and the like may be used. The heaters 28a are installed on a part on a lower side of the transporting conveyor belt 30 with raw material dough pieces being arranged on the belt, but a selection may be made according to need, whether they are installed on an upper side or both on the upper and lower sides of the belt. Moreover, an isolation panel 21 serving as a top panel of the first drying compartment 22 is provided with exhaust holes 22a at appropriate intervals and substantially at the same intervals, while isolation panels 21 on both sides serving as side walls are provided with ventilation louvers 29a, 29b (ventilation windows with sliding doors) and the hot blast stirring fans 28b which are located at opposed positions of each of the isolation panels 21, 21. The ventilation louvers 29a, 29b and the hot blast stirring fans 28b are installed respectively at 40 points along the first drying compartment 22 which has a full length of about 115 m. Ventilation fans 43 are mounted at appropriate positions on one isolation panel 21 serving as a wall portion of the maturing compartment 25, while the isolation panel 21 being the opposite surface of the ventilation fans 43 is provided with ventilation louvers 44 (ventilation windows with sliding doors) for ventilation at appropriate positions. For the drying compartment of a size as above stated, about 20 of the ventilation fans 43 and about 20 of the ventilation louvers 44 are provided.

Inter-stage transporting means 35 of a commonly known assembly are provided on an outer circumference of driving rollers 31 (which are alternately arranged on left and right sides) of the respective transporting conveyor belts 30 for transporting raw material dough pieces from an upper stage of transporting conveyor belt 30 to a next stage of transporting conveyor belt 30. The inter-stage transporting means 35 may be, needless to say, provided on a side of an end roller 32. In order to transport the raw material dough pieces from the upper stage of transporting conveyor belt 30 to the next stage of transporting conveyor belt 30, the inter-stage transporting means 35 is assembled such that, in particular as shown in FIG. 5, a transporting endless conveyor 36 made of, for example, canvas of the inter-stage transporting means 35 is slightly pressure-contacted with the transporting conveyor belt 30 at a point where it is suspended on the driving roller 31, enabling in this manner to transport the raw material dough pieces as being sandwiched between the transporting conveyor belt 30 and the transporting endless conveyor 36 to the next stage of transporting conveyor belt 30. And then, the releasing conveyor 33 extends, especially as shown in FIGS. 3 to 5, below a left end portion of the end roller 32 at a lowermost stage in the maturing compartment 25 of the first drying compartment 22, for releasing the raw material dough pieces from the first drying compartment 22.

Figure 7:
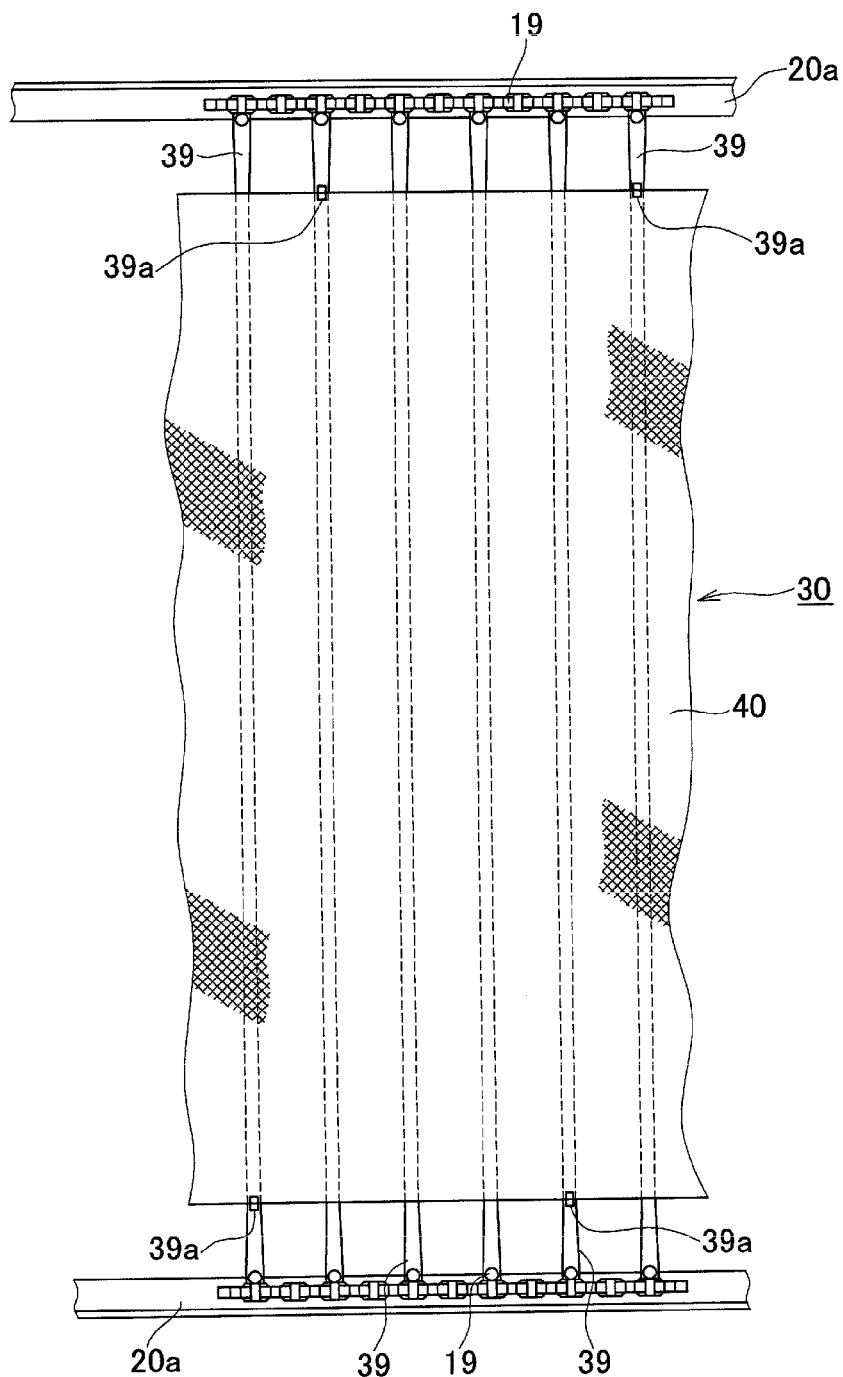
FIG. 7 is an explanatory diagram of a transporting conveyor belt of raw material dough pieces used in an embodiment of the present invention.

Each of transporting conveyor belts 30 comprises, especially as shown in FIGS. 6 and 7, a pair of left and right endless chains 19, 19 mounted apart on the opposed sides of the belt for sliding on guide rails 20a fixed on the frames 20, and a plurality of crossbars 39 located between the endless chains 19, 19 at identical intervals. The respective transporting conveyor belt 30 is assembled by binding and attaching a stainless or galvanized wire mesh 40 using wires of the same material (not shown) to the crossbars 39, and metal stoppers 39a are mounted, each at an appropriate position of each of the crossbars 39, for preventing a shift of the wire mesh 40 to either one side of the belt. Note that, the assembly of the transporting conveyor belts 30 is not particularly limited to that described above, but later-described transporting wire mesh conveyor belts and the commonly known ones using canvas may also be used.

Figure 8:
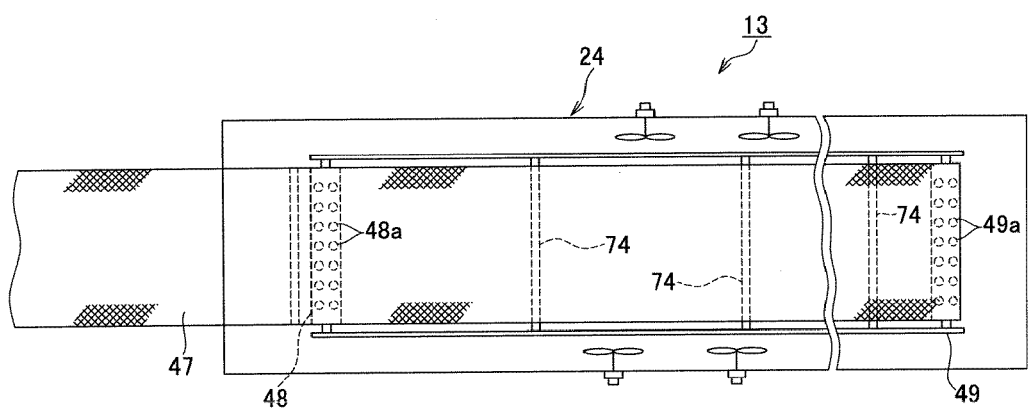
FIG. 8 is an explanatory diagram showing another example of the transporting conveyor belt of raw material dough pieces used in an embodiment of the present invention.
Figure 9:
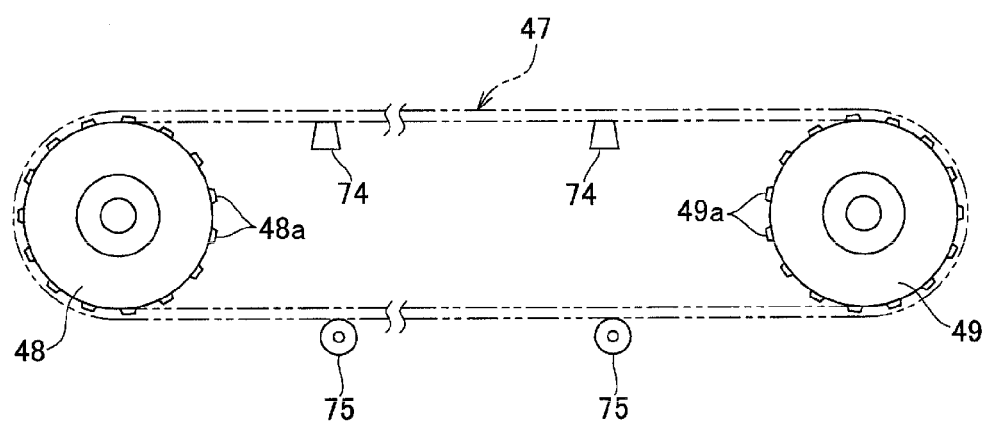
FIG. 9 is a view explaining a driving method of the transporting conveyor belt shown in FIG. 7.
Figure 10:
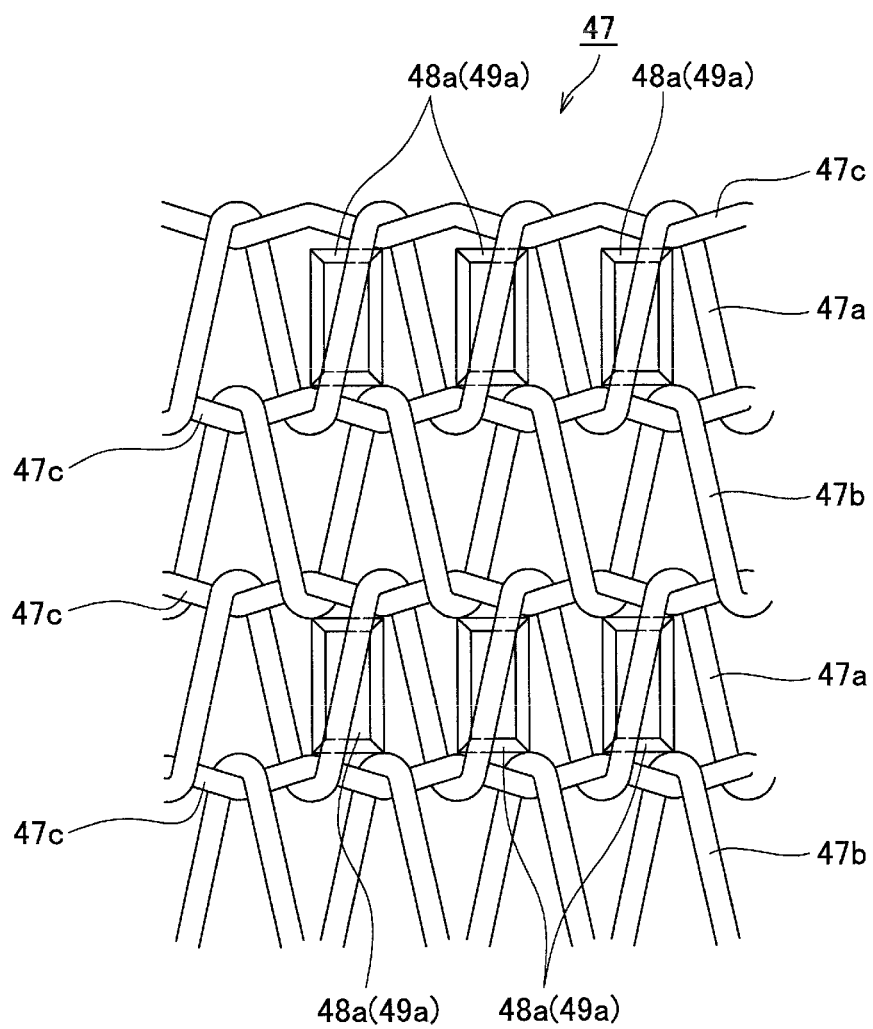
FIG. 10 is a partial exploded view explaining engagement relationship between the transporting conveyor belt shown in FIG. 7 and roller teeth.
Figure 11:
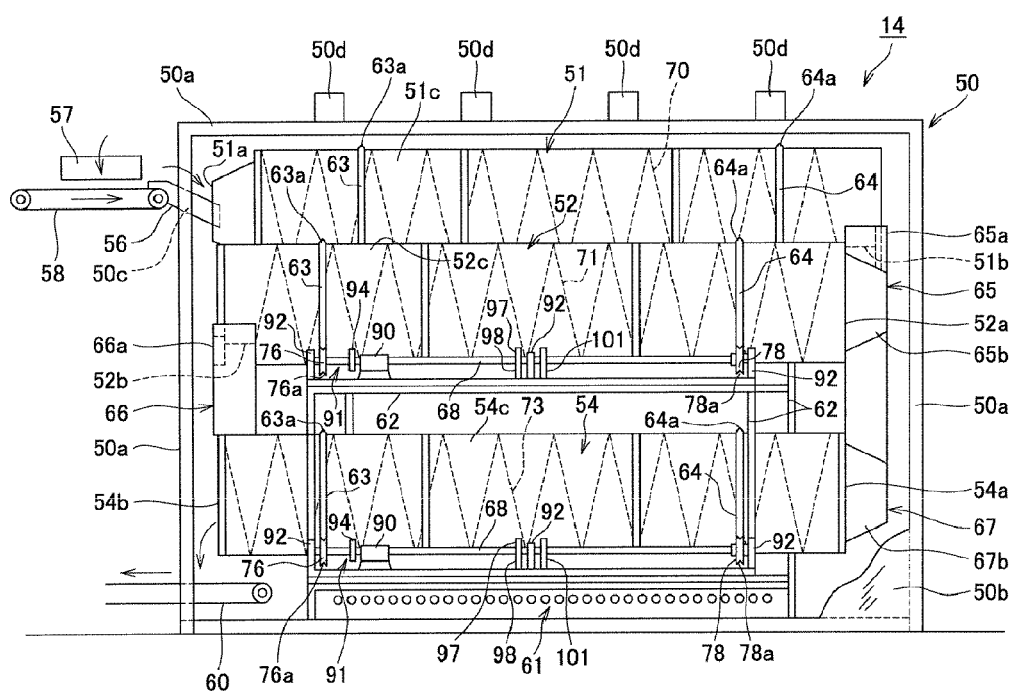
FIG. 11 is a schematic elevation view showing a second drying apparatus for an embodiment of the present invention.
Figure 12:
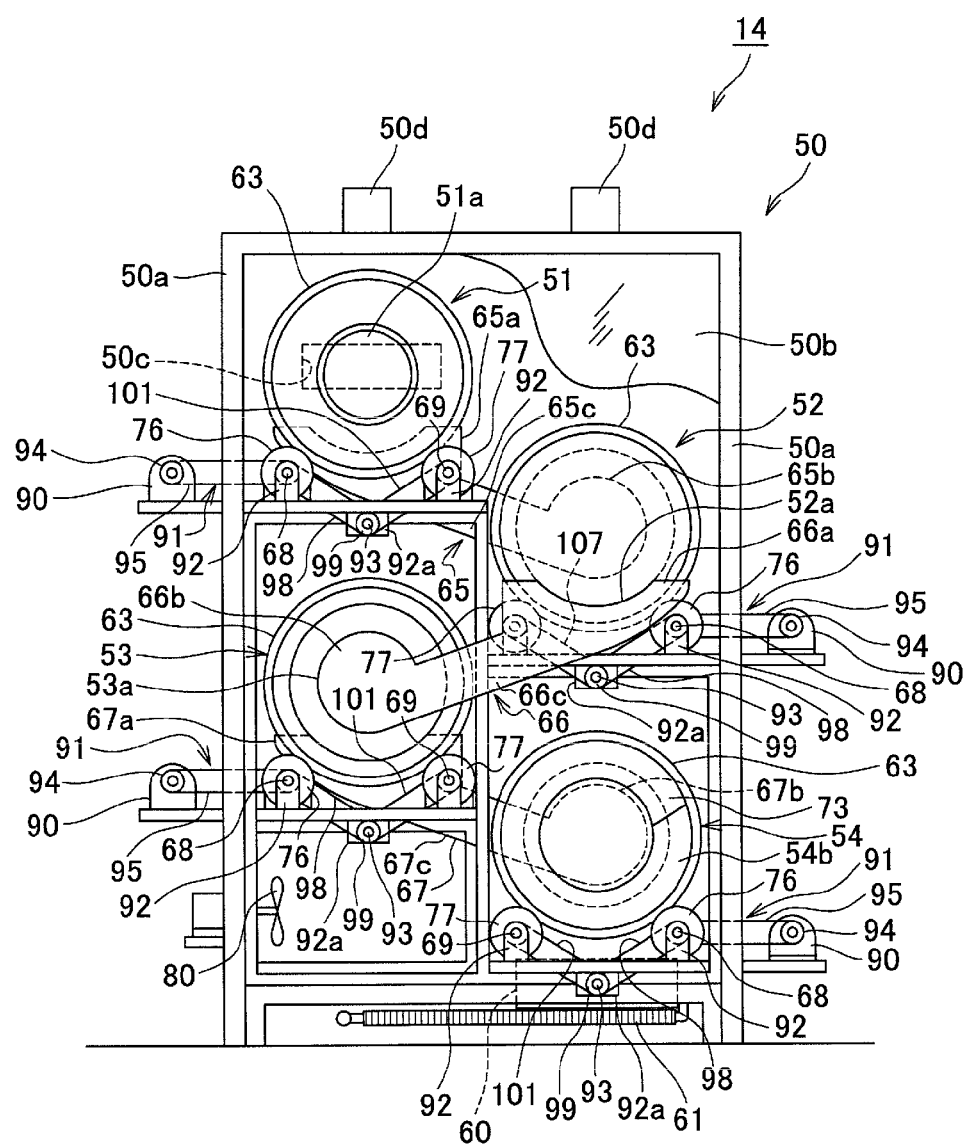
FIG. 12 is a schematic left-side view showing a second drying apparatus for an embodiment of the present invention.
Figure 13:
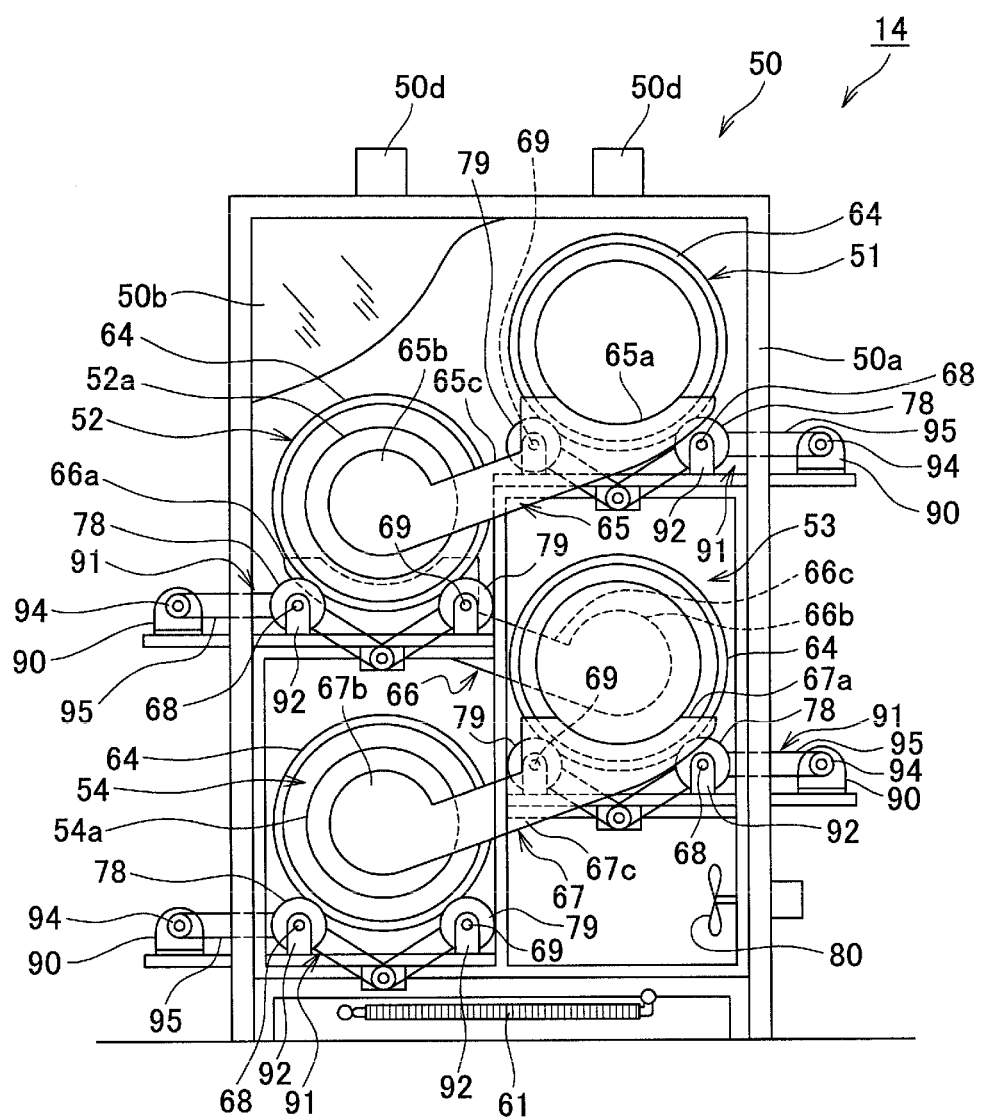
FIG. 13 is a schematic right-side view showing a second drying apparatus for an embodiment of the present invention.

In particular, as a transporting conveyor belt 30 traveling inside the hot blast drying compartment 24, a transporting wire mesh conveyor belt 47 without chains and crossbars as shown in FIGS. 8 to 10 may also be used other than the one according to the above described embodiment. The transporting wire mesh conveyor belt 47 comprises, especially as shown in FIG. 10, pairs of right-handed helical wire wraps 47a and left-handed helical wire wraps 47b made from stainless, galvanized wires or the like, each pair of the wraps being alternately interwoven using curved wires 47c. The transporting wire mesh conveyor belt 47 is trained about a driving roller 48 having a plurality of teeth 48a and a driven roller 49 having a plurality of teeth 49a, so that the conveyor belt cyclically travels. Note that, the driving roller 48 and the driven roller 49, and in particular the teeth 48a, 49a are subjected to a quenching treatment in advance, so that these components are free from wear caused by the heated transporting wire mesh conveyor belt 47. Moreover, the teeth 48a, 49a are arranged over the whole circumference of the driving roller 48 and the driven roller 49 of the transporting wire mesh conveyor belt 47 in an axial direction thereof. Only a part of the teeth 48a, 49a is engaged with the transporting wire mesh conveyor belt 47. These teeth 48a, 49a are flat-topped and do not protrude from an outer surface of the transporting wire mesh conveyor belt 47. Each of the teeth 48a, 49a engaged with the transporting wire mesh conveyor belt 47 is engaged with the curved wires 47c as particularly shown in FIG. 10, with its top surface lying under a portion of right-handed helical wire wrap 47a or left-handed helical wire wrap 47b which is located over the curved wire 47c. Therefore, the teeth 48a, 49a are so adjusted that, when raw material dough pieces traveling on an upper surface of the transporting wire mesh conveyor belt 47 are transported from an upper to a next stage of the transporting conveyor belt 30 using the inter-stage transporting means 35 as shown in particular in FIG. 5, the dough pieces are free from fear of scratch, crush or deformation caused by the teeth 48a, 49a. Further, as shown in FIG. 9, reference numerals 74 and 75 denote respectively loosening prevention members and guide rollers for the transporting wire mesh conveyor belt 47.

When transporting conveyor belts are constructed by transporting wire mesh conveyor belts as described above, an extension and loosening of the transporting wire mesh conveyor belt itself occurred during use can be prevented and a cyclical movement can be achieved even without chains and crossbars which are used in an previous embodiment, so that there are advantages in that a transporting conveyor belt can be produced with a reduced cost, in addition to preventing a lubricant to be applied to chains from smearing (raw material) dough pieces.

Hereinafter, reference is made to the case that raw material dough pieces are dried using the first drying apparatus 13 (the step may also be referred to as water content adjustment). Thin raw material dough pieces (1 mm thick) e.g. made from non-glutinous rice and cut out during the shape cutting step 11a using the shape cutting apparatus 11 are arranged in lines and transported on the transporting conveyor belt 30. These dough pieces are carried into the hot blast compartment 24 of the first drying compartment 22 of the first drying apparatus 13 through the inlet 24a, so that the pieces are subjected to the first drying step 13a, as described above. In the first drying step 13a, while the raw material dough pieces travel on the transporting conveyor belts 30 provided at four stages for about 48 minutes (12 minutes per one stage), they are dried under a hot blast atmosphere of about 70 to 80° C. generated by the heaters 28a and the hot blast stirring fans 28b, and their water content is adjusted by drying them so that it becomes about 13 to 14% at the end of the lowermost (stage of) transporting conveyor belt 30. It is stated in the foregoing that, in transporting the dough pieces from the upper to the lower of the transporting conveyor belts 30, they are transported in a state of being aligned using the inter-stage transporting means 35. The transporting conveyor belts 30 according to the present embodiment are provided at four stages, but the number of the stages is not particularly limited thereto. Moreover, a temperature inside the hot blast compartment 24 is about 70 to 80° C. in this embodiment as above stated, but even the temperature is not limited to the above-stated one, but an optimal temperature is selected according to the material, size, and thickness etc. of the raw material dough. Additionally, the temperature inside the hot blast compartment 24 is adjusted as appropriate by the exhaust holes 22a, the ventilation fan 43 and the ventilation louvers 29a, 29b via a temperature measurement means such as a thermostat which is not shown.

In this manner, the raw material dough pieces having arrived at the end of the lowermost (stage of) transporting conveyor belt 30 finish the first drying step 13a and subsequently undergo the maturing step 25a. In the maturing step 25a, the raw material dough pieces are arranged in lines and thus transported via the inter-stage transporting means 35 onto a transporting conveyor belt 45 of the cooling portion 26 of the maturing compartment 25 located below separated by the isolation panel 23. There is no heater inside the maturing compartment 25, and here a temperature is adjusted by the ventilation fan 43 and the ventilation louvers 44 for cooling. A duration required for this step is about 12 minutes. After this cooling step, the raw material dough pieces are transported in an unarranged state without using the inter-stage transporting means 35 to a lowermost (stage of) transporting conveyor belt 46 of the maturing portion 27, and subjected to a water adjustment by maturing which requires a duration of about 30 to 35 minutes. By this maturing step 25a, the water content of the raw material dough is adjusted to 12±0.5%. Note that, a travel speed of the transporting conveyor belt 46 for conducting the maturing step 25a inside the maturing compartment 25 is slower, and is reduced to one third at the maximum, as compared to that of the transporting conveyor belts 30 in the hot blast compartment 24 and that of the transporting conveyor belt 45 in the maturing compartment 25, and therefore during this step, the dough pieces travel slowly, so that they are matured in an unarranged state. Since the raw material dough pieces are unarranged while transported on the transporting conveyor belt 46 and their travel speed is slower than that on the upper (stage of) transporting conveyor belt 45, an equalization of water content among respective raw material dough pieces is achieved, while they are transported by being overlapped with each other.

In particular as shown in FIGS. 4 and 5, the raw material dough pieces reached an end of the transporting conveyor belt 46 for the maturing portion 27 inside the maturing compartment 25 are released via the releasing conveyor 33 from the first drying apparatus 13, and further, as shown in FIG. 4, travel through the transporting conveyor belt 37 to the second drying apparatus 14.

FIGS. 11 to 21 schematically show a structure of the second drying apparatus 14, and according to the drawings, a reference numeral 50 denotes a second drying compartment composing the second drying apparatus 14. The second drying compartment 50 is assembled by surrounding a machine frame 50a with isolation walls 50b coated with, for example, glass wool, etc., and as per its size, for instance, 5 m long, 3.5 m high and 2 m wide respectively as measured approximately. Further, on its upper portion, a plurality of exhaust dampers 50d for controlling temperature is installed. First to fourth rotary drums 51 (, 52, 53,) to 54, respectively having an approximately ø90 caliber, are so installed that they are arranged in a zigzag shape as seen from one side. Each of the first to fourth rotary drums 51, 52, 53, 54 has a basically identical inner structure, and in their interiors, respective first to fourth transporting band bodies 70, 71, 72, 73 having spiral shapes are installed. Outer circumference walls 51c, 52c, 53c, 54c covering respective outer circumferences of the first to fourth transporting band bodies 70, 71, 72, 73 are provided.

The outer circumference walls 51c, 52c, 53c, 54c are e.g. made from stainless steel (SUS) which shows a high thermal conductivity. The outer circumference walls 51c, 52c, 53c, 54c may be provided with a large number of punch holes or may use a heat resistant resin. Moreover, they may also be stainless wire meshes. Note that if the outer circumference walls 51c, 52c, 53c, 54c of the respective first to fourth rotary drums 51 (, 52, 53,) to 54 are provided with punch holes or structured with a wire mesh, waste collecting portions for receiving wastes falling off the raw material dough are preferably disposed at lower stages of the respective first to fourth rotary drums 51 (, 52, 53,) to 54, or on an upper portion of a heating means.

Next, a feeding opening 50c is arranged on the isolation wall 50b at one side portion of the second drying compartment 50, in such a manner that it is opposed to a receiving opening 51a mounted on one side end portion of an uppermost (stage of) first rotary drum 51. Moreover, a hopper 56 is installed so as to face the receiving opening 51a via the feeding opening 50c. Transporting conveyor belts 57, 58 are further provided for transporting raw material dough after the first drying step and the maturing step to the hopper 56. Further, a delivery opening 54b is mounted on a side portion of a lowermost (stage of) fourth rotary drum 54, and a transporting conveyor belt 60 is installed below the delivery opening 54b. At the lowermost portion of the second drying compartment 50, a heating means 61 comprising e.g. an aerofin heater is installed in a horizontal direction. Note that, a reference numeral 80 represents a hot air stirring fan.

Each of the first to fourth rotary drums 51 (, 52, 53,) to 54 is rotatably installed using first to fourth driving rollers 76, 77, 78, 79, which amount to four and are installed in right and left pairs in an inner machine frame 62 provided in the second drying compartment 50, as well as a driving means 91 including a driving motor 90 comprising e.g. an inverter-controlled geared motor. Furthermore, the respective first to fourth rotary drums 51 (, 52, 53,) to 54 are provided with receiving openings 51a, 52a, 53a, 54a on one-side portions, as well as delivery openings 51b, 52b, 53b, 54b on the other side portions, both openings being alternately located. The receiving opening 51a has substantially a shape of truncated cone, while the other receiving openings 52a, 53a, 54a are simply circular holes. Additionally, the delivery openings 51b, 52b, 53b are holes cut on the respective outer circumferences of the first to third rotary drums 51, 52, 53, while the delivery opening 54b is shaped by cutting an end surface of the fourth rotary drum 54.

The delivery opening 51b on the upper (stage of) first rotary drum 51 is structured so as to deliver the raw material dough via a first chute means 65 to the receiving opening 52a of the second rotary drum 52 at a stage located immediately below in an obliquely downward direction. Further, the second rotary drum 52 is structured so as to deliver the raw material dough via a second chute means 66 to the third rotary drum 53 at a stage located below in an obliquely downward direction. And then, the third rotary drum 53 is structured so as to deliver the raw material dough via a third chute means 67 to a lowermost (stage of) fourth rotary drum 54. The respective first to third chute means 65, 66, 67 comprise hopper portions 65a, 66a, 67a abutting on the respective delivery openings 51b, 52b, 53b, and chute portions 65b, 66b, 67b in a shape substantially of truncated cone fitted into the respective receiving openings 52a, 53a, 54a, as well as gutter portions 65c, 66c, 67c connecting respectively the hopper portions 65a, 66a, 67a and the chute portions 65b, 66b, 67b.

Each of the driving means 91 for rotating the respective first to fourth rotary drums 51 to 54 is identical in its assembly, so detailed reference is made to the driving means for only one rotary drum, e.g. the third rotary drum 53. As shown in particular in FIGS. 14 and 18, the third rotary drum 53 has driven rings 63, 64, each having a pentagonal cross section and mounted on outer circumferences on both sides, which applies also to the remaining first, second and fourth rotary drums 51, 52, 54. The driven rings 63, 64 are so assembled that they are rotatably supported respectively by four driving rollers, i.e. first to fourth driving rollers 76, 77, 78, 79 attached to the inner machine fame 62. At this time, chevron convex portions 63a, 64a on outer circumferences of the respective driven rings 63, 64 and concave grooves 76a, 77a, 78a, 79a provided on outer circumferences of the respective first to fourth driving rollers 76, 77, 78, 79 are fitted with each other.

Figure 14:
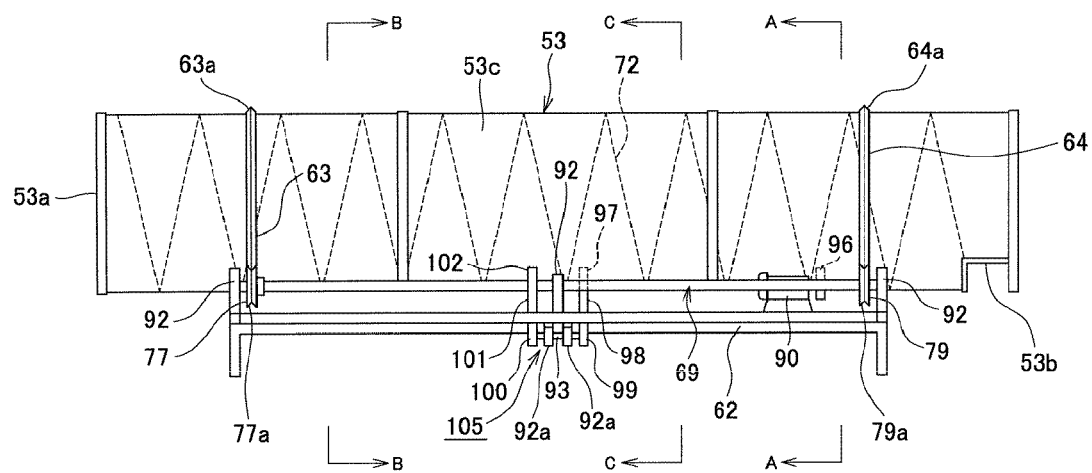
FIG. 14 is an elevation view explaining a driving means of rotary drums of a second drying apparatus for an embodiment of the present invention.
Figure 15:
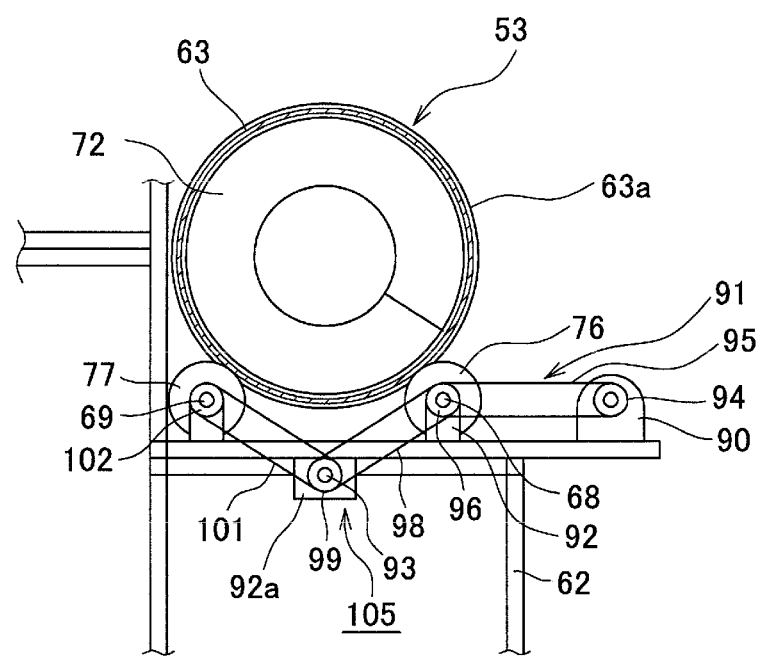
FIG. 15 is a cross-sectional view of FIG. 14 along A-A.
Figure 16:
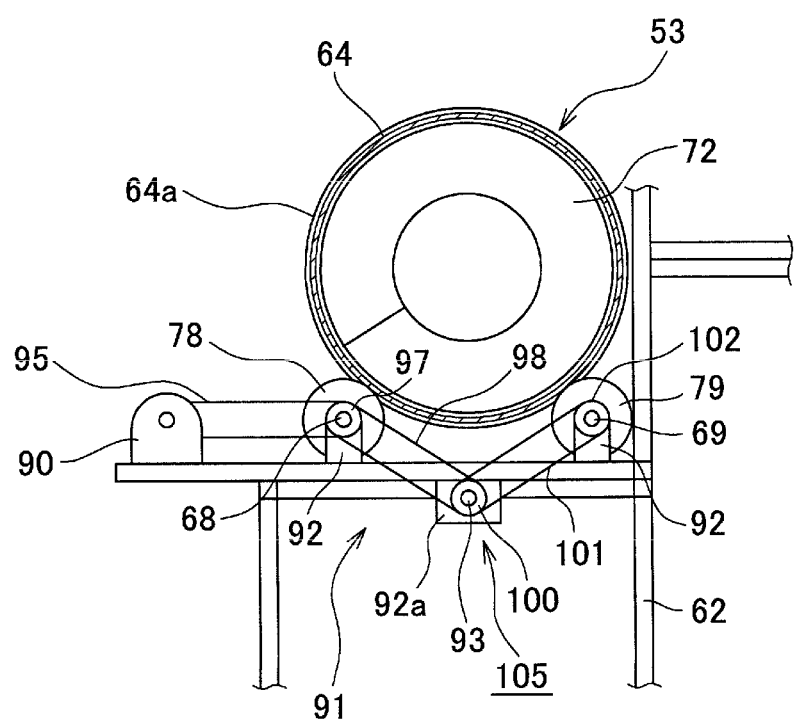
FIG. 16 is a cross-sectional view of FIG. 14 along B-B.
Figure 17:
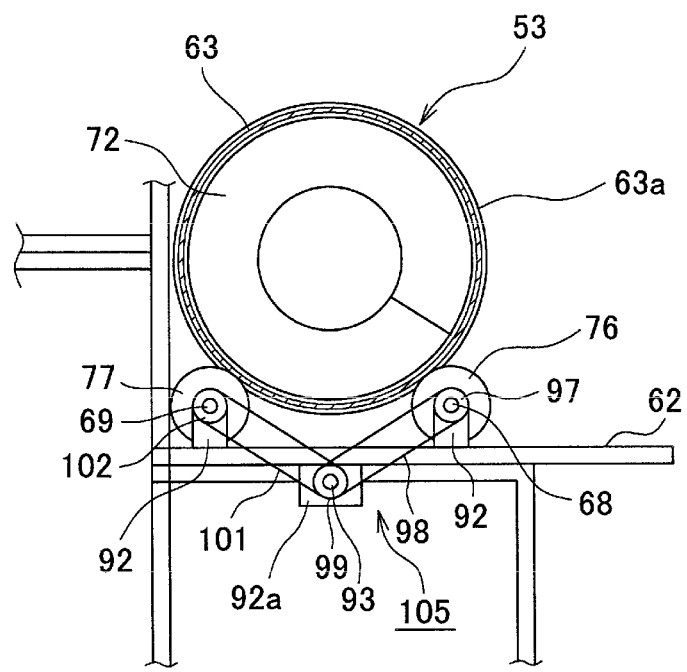
FIG. 17 is a cross-sectional view of FIG. 14 along C-C.
Figure 18:
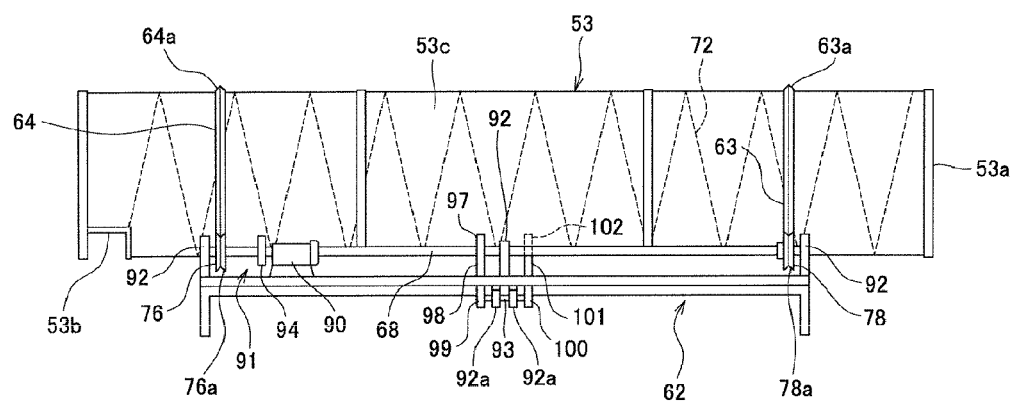
FIG. 18 is a rear view explaining a driving means of rotary drums of a second drying apparatus for an embodiment of the present invention.
Figure 19:
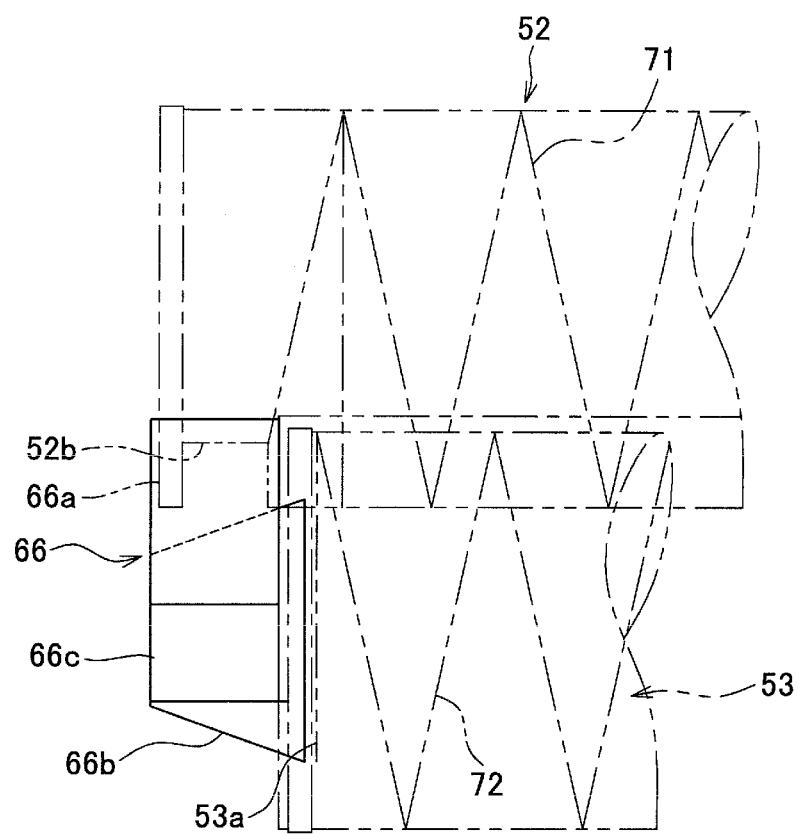
FIG. 19 is an elevation view explaining a chute means of a second drying apparatus for an embodiment of the present invention.
Figure 20:
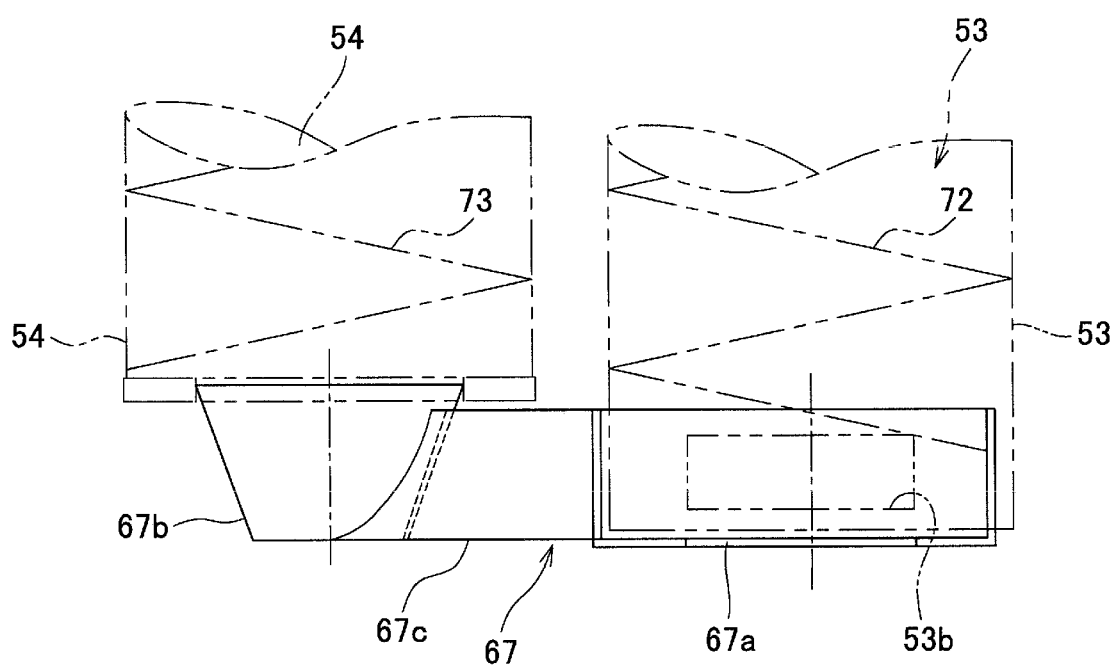
FIG. 20 is a plan view explaining a chute means of a second drying apparatus for an embodiment of the present invention.
Figure 21:
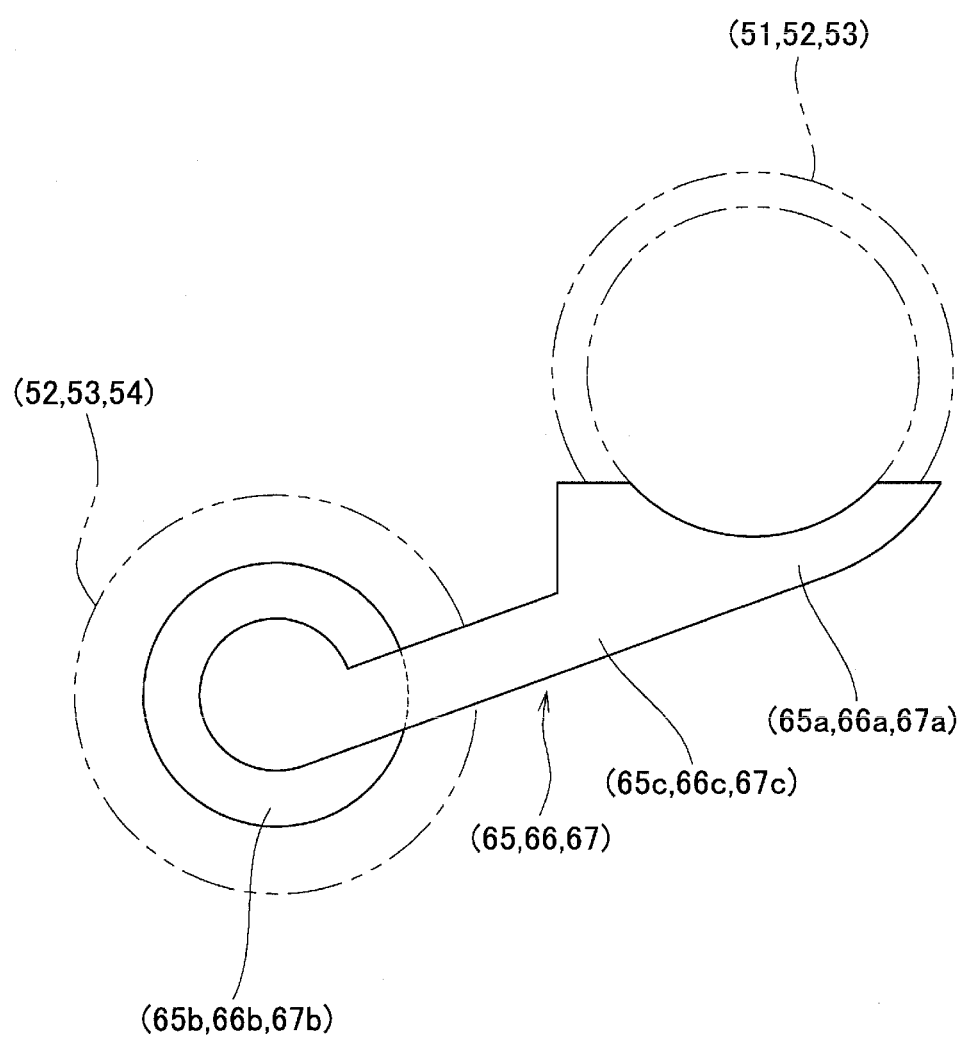
FIG. 21 is a side view explaining a chute means of a second drying apparatus for an embodiment of the present invention.

Each of the first to fourth driving rollers 76, 77, 78, 79 is mounted to a first and a second rotary shafts 68, 69 axially supported via bearing members 92, 92 on the inner machine frame 62 so as to be rotatable, and of these the first rotary shaft 68 receives, in particular as shown in FIG. 14, a rotary driving force of the driving motor 90, which is transmitted via a driving pulley 94 and a driving belt 95, as well as a driven pulley 96 mounted to the rotary shaft 68.

The other second rotary shaft 69 receives, as shown in particular in FIGS. 14 to 17, a rotary driving force which is transmitted via a rotary driving force transmitting means 105 from the first rotary shaft 68. More specifically, the rotary driving force is transmitted from a first intermediary pulley 97 mounted on a substantially central portion of the first rotary shaft 68 via a driving belt 98 to a second intermediary pulley 99 mounted on a rotary shaft 93 axially supported on bearing members 92a, 92a mounted on a lower portion of the inner machine frame 62. The force is further transmitted to the second rotary shaft 69, via a third intermediary pulley 100 coaxially mounted on the second intermediary pulley 99, as well as a fourth intermediary pulley 102 mounted via a driving belt 101 on the second rotary shaft 69. Note that, the driving belts are preferably V-belts, but timing belts, chains, etc. may be used as necessary. As per assembly of driving means 91 of the remaining rotary drums, i.e. first, second, and fourth rotary drums 51, 52, 54, description is omitted, since driving means thereof have an assembly identical to that of the driving means 91, as above stated.

It is a requirement for preventing an axial movement and enabling a stabilized rotation at a fixed position at the time of rotation of the third rotary drum 53 that, as above stated, the respective driven rings 63, 64 of the third rotary drum 53 and the respective driving rollers 76, 77, 78, 79 are fixed at the convex portions 63a, 64a and the concave grooves 76a, 77a, 78a, 79a with each other. This applies also to the remaining rotary drums, i.e. first, second, and fourth rotary drums 51, 52, 54. As per convex portions of the respective driven rings 63, 64 of the above-mentioned respective first to fourth rotary drums 51 (, 52, 53,) to 54 and concave portions of the respective driving rollers, respective shapes may also be contrary to the above-stated ones.

Moreover, if the respective first to fourth rotary drums 51 (, 52, 53,) to 54 are so assembled that they are supported from the both sides using the respective first to fourth driving rollers 76 (, 77, 78,) to 79, even without a rotary shaft passing through each of the first to fourth rotary drums 51 (, 52, 53,) to 54 in an axial direction, the first to fourth rotary drums 51 (, 52, 53,) to 54 can be stably rotated.

Note that, although not illustrated, a selection of providing an inclination on each of the first to fourth rotary drums 51 (, 52, 53,) to 54 toward a delivery direction of the raw material dough pieces can be arbitrarily made, as well as of providing an adjusting means which can adjust an inclination angle.

Reference will be made in the following to a second drying step of the raw material dough pieces using the second drying apparatus 14. As above stated, the raw material dough pieces after the first drying step and the maturing step inside the first drying apparatus 13, with their water content being adjusted to 12%±0.5, then undergo a second drying step 14a using the second drying apparatus 14. First, the raw material dough pieces are transported from the hopper 56 via the transporting conveyor belts 57, 58 into the uppermost (stage of) first rotary drum 51 through its receiving opening 51a. The interior of the second drying compartment 50 of the second drying apparatus 14 is heated by the heating means 61 to a temperature required for water content adjustment during the step (50 to 70° C.), prior to receiving the raw material dough pieces. The respective first to fourth rotary drums 51 (, 52, 53,) to 54 rotate in the heated atmosphere obtained in this manner at 1.33 rpm. As stated above, the raw material dough pieces transported into the uppermost (stage of) first rotary drum 51 are heated via the first transporting band body 70 in the first rotary drum 51 in an unarranged state and in a mutually overlapped manner and further delivered in approximately 7 minutes toward the delivery opening 51*b*, from which they pass through the first chute means 65 and are further transported through the receiving opening 52*b* of the second rotary drum 52 at the next stage into the second rotary drum 52. These dough pieces are then traveled by the second transporting band body 71 inside the second rotary drum 52 while being heated and pass through the second chute means 66 starting from the delivery opening 52*b*, so that they are delivered through the receiving opening 53*a* into the third rotary drum 53 at the third stage. They further travel via the third transporting band body 72 inside the third rotary drum 53 while being heated toward the delivery opening 53*b*, so that they are delivered through the receiving opening 54*a* into the fourth rotary drum 54 at the fourth stage via the third chute means 67. The dough pieces travel while being heated via the fourth transporting band body 73 inside the fourth rotary drum 54 and are transported out of the delivery opening 54*b*, so that they are transported onto the transporting conveyor belt 60. It takes totally about 30 minutes for an overall second drying step.

In this manner, the raw material dough pieces transported to the uppermost (stage of) first rotary drum 51 of the second drying apparatus 14 with water content adjusted to 12±0.5%, of which the water content is further adjusted during the second drying step to 11±0.5%, are delivered out of the delivery opening 54*b* of the fourth rotary drum 54 and further travel, as shown in FIG. 1, via the transporting conveyor belt 60 toward the aligner 15, and after being aligned in the aligner 15, they are further transported to the baking apparatus 16 at the next step.

Thin confectionery products made from cereals and having uniform shapes can be manufactured with high quality without any crack, curved profile, hard surface and the like at a satisfactory yield by using the above-described respective manufacturing apparatus and in particular using the first and the second drying steps.

The present invention can, as has been described in details in the foregoing, prevent a crack, a curved profile, a hard surface, and the like, and is thus suitably used in a process and an apparatus for manufacturing confectionery products made from cereals, and in particular thin products.

What is claimed is:

1. A process for manufacturing thin confectionery products made from cereals and having uniform shapes, the process comprising the steps of:
   providing a quantity of raw material dough;
   cutting said quantity of raw material dough into raw material dough pieces;
   performing a first drying step, said first drying step comprising adjusting the water content of raw material dough pieces;
   performing a cooling step, said cooling step comprising cooling said raw material dough pieces received from said first drying step;
   performing a maturing step, said maturing step comprising maturing said raw material dough pieces received from said cooling step;
   performing a second drying step, said second drying step comprising further adjusting the adjusted water content of said raw material dough pieces received from said maturing step;
   performing a baking step, said baking step comprising baking said raw material dough pieces received from said second drying step;
   wherein for said first drying step, a first drying compartment is employed which is divided via a partition wall into an upper level, said upper level comprising a hot blast drying compartment, and a lower level, said lower level being a maturing compartment, wherein said raw material dough pieces are arranged in lines and transported on a transporting conveyor belt, and at the same time said raw material dough pieces are dried in a hot blast, in said hot blast drying compartment of said upper level, said raw material dough pieces then being transported from a transporting conveyor belt of said hot blast drying compartment on said upper level to a transporting conveyor belt of said maturing compartment of said lower level, and said raw material dough pieces being arranged in lines on said transporting conveyor belt, are transported in said maturing compartment such that they undergo a cooling step and a maturing step; and
   wherein for said second drying step, a second drying apparatus is employed, said second drying apparatus comprising a second drying compartment covered with isolation walls and having a hopper at an upper portion thereof and a transporting conveyor at a lower portion thereof, a first to fourth rotary drums rotatably mounted in said second drying compartment such that they define a zig-zag shape when viewed from one side, and a first to third chute means for allowing said rotary drums to communicate with one another, said second drying compartment being provided with a warmed atmosphere by an aerofin heater, a plurality of exhaust dampers, hot air stirring fans, and a heating means which are installed in said second drying compartment, said rotary drums each having transporting band bodies with spiral shapes and being rotated of each other in an axial direction in said second drying compartment, and after said maturing step, said raw material dough pieces being sent to said first rotary drum of said first to fourth rotary drums via said hopper,
   wherein the first to fourth rotary drums rotate in the warmed atmosphere,
   whereby said raw material dough pieces are transported in an unarranged state in an axial direction via said transporting band body and dried, and said raw material dough pieces are then sequentially transported respectively to said second to fourth rotary drums by said first to third chute means, so that drying is conducted, and after said second drying step, said raw material dough pieces are sent to said baking step via said transporting conveyor.

2. The process according to claim 1, wherein first drying compartment of said first drying step having a conveyer belt for cooling and a conveyer belt for maturing, and during said maturing step, a travel speed of the conveyor belt for maturing is reduced as compared with the conveyor belt for cooling.

3. The process according to claim 1, wherein the water content of said raw material dough pieces is so adjusted that it becomes 13 to 14% at the time of completion of said first drying step.

4. The process according to claim 1, wherein water content of said raw material dough pieces is so adjusted that it becomes 12%±0.5 at the time of completion of said maturing step.

5. The process according to claim 1, wherein the water content of said raw material dough pieces is so adjusted that it becomes 11%±0.5 at the time of completion of said second drying step.

* * * * *